R. CRONLEY & F. G. AXTELL.
SPEED INDICATOR.
APPLICATION FILED JAN. 21, 1913.
1,087,217.
Patented Feb. 17, 1914.
2 SHEETS—SHEET 2.
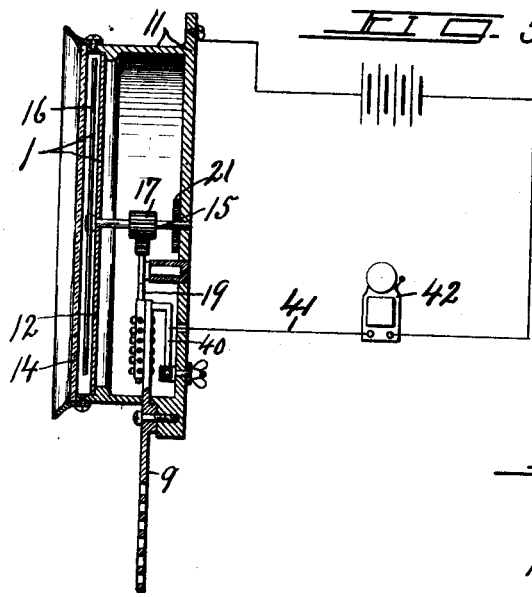
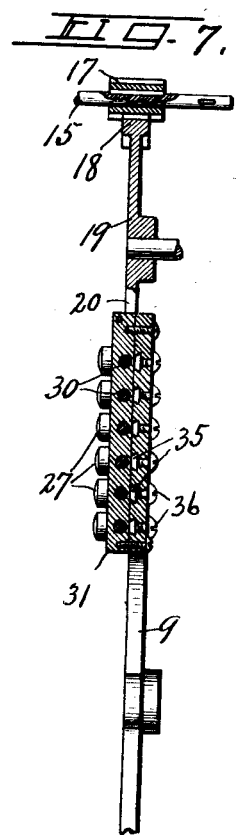
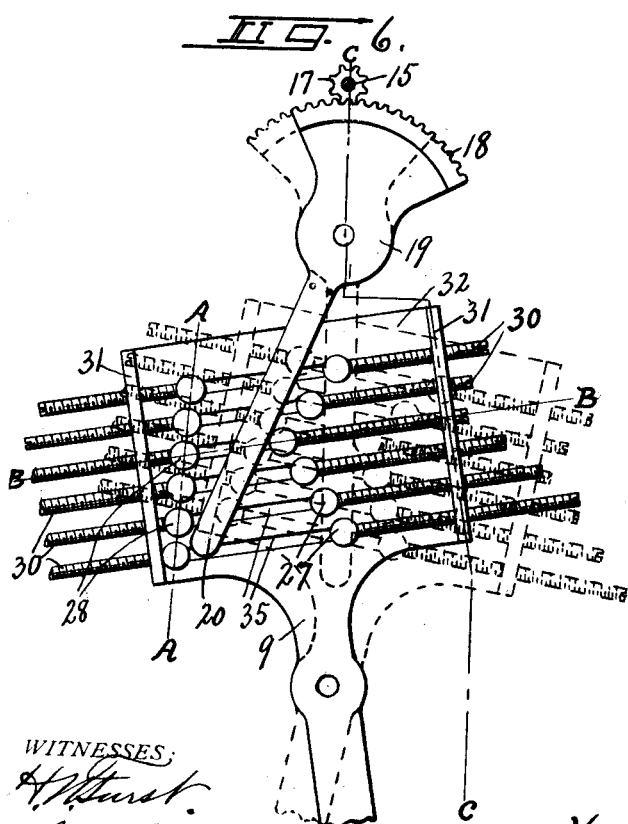
WITNESSES:
INVENTORS
R. Cronley and
F. G. Axtell
BY Howard P. Denison
ATTORNEY.

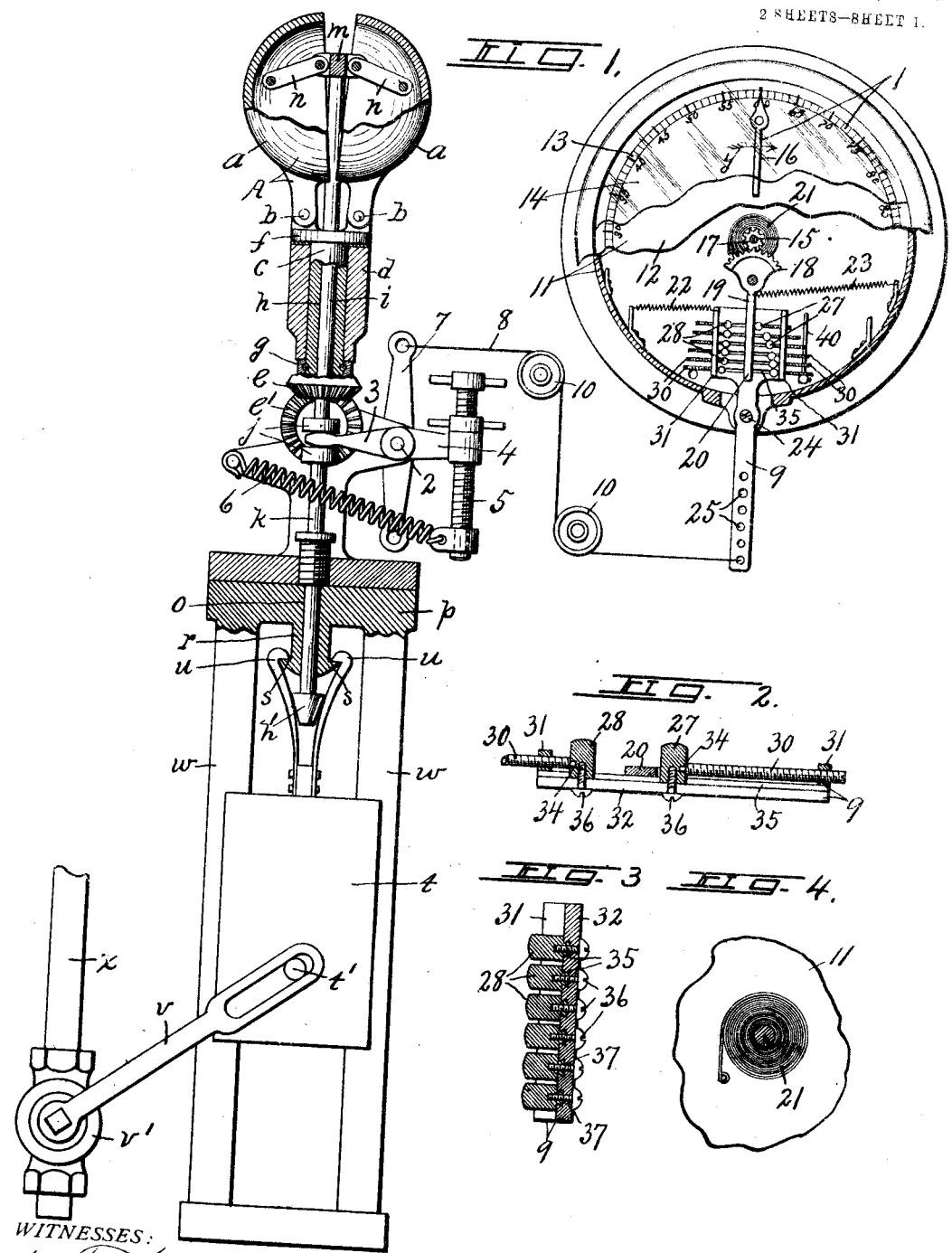

UNITED STATES PATENT OFFICE.

ROBERT CRONLEY AND FREEMAN G. AXTELL, OF OSWEGO, NEW YORK.

SPEED-INDICATOR.

1,087,217.

Specification of Letters Patent. Patented Feb. 17, 1914.

Application filed January 21, 1913. Serial No. 743,267.

*To all whom it may concern:*

Be it known that we, ROBERT CRONLEY and FREEMAN G. AXTELL, of Oswego, in the county of Oswego, in the State of New York, have invented new and useful Improvements in Speed-Indicators, of which the following, taken in connection with the accompanying drawings, is a full, clear, and exact description.

This invention relates to certain improvements in speed indicators for governor controlled engines, pumps, and similar apparatus in which it is desired to regulate and indicate the speed.

The main object is to operate a speed indicator directly from the governor so that the speed of the engine, pump or other device may be read upon the dial at any time.

Another object is to provide for adjustable connections between the governor and index finger of the indicator to facilitate calibration and accuracy of reading.

A further object is to utilize a part of the indicator-operating mechanism for automatically actuating an alarm when the speed reaches a predetermined or maximum safe degree.

A still further object is to provide means for automatically shutting off the supply of motive fluid in case the speed of the governor should exceed a predetermined degree.

Other objects and uses relating to specific parts of the indicator will be brought out in the following description.

In the drawings—Figure 1 is an elevation partly in section of a governor-controlled speed indicator, embodying the various features of our invention and showing also the means for disconnecting the governor from its actuating means in case the speed should exceed a predetermined limit. Fig. 2 is a detail sectional view through the actuating levers for the index finger taken on line A—A, Fig. 6 and showing adjustable connections between said levers. Fig. 3 is a further detail sectional view through one of the series of adjustable bearing members taken on line B—B, Fig. 6. Fig. 4 is a face view of the retracting spring for the index finger. Fig. 5 is a transverse vertical sectional view through the indicator and its actuating lever, showing diagrammatically an electric alarm connected to said indicator. Fig. 6 is an enlarged face view of the actuating levers for the index finger showing the opposed series of adjustable bearing members. Fig. 7 is a sectional view of the same mechanism taken on line C—C, Fig. 6.

This speed indicator is adapted to be used in connection with and operated by a speed-regulating governor as —A— of an engine, steam pump, or similar apparatus, the speed of which is to be determined, and, in this particular instance, we have shown one form of governor as provided with hollow semi-spherical sections —a— which are hinged at their lower ends at —b— to a revolving sleeve or spindle —c— which is journaled in a suitable bearing —d— and adapted to be rotated by intermeshing bevel gears —e— and —e'— as shown more clearly in Fig. 1, one of the gears, as —e'— being adapted to be driven by the engine, pump or similar apparatus not shown.

The sleeve —c— is held against axial movement by annular shoulders —f— and —g— engaging respectively the upper and lower ends of the bearing —d— and is preferably provided with a lengthwise guide opening —h— for receiving an axially movable rod —i— which extends some distance beyond the opposite ends of the sleeve and may or may not rotate therewith. The lower end of this spindle —i— is stepped in a suitable socket or bearing in the upper one of two collars —j— which are secured to the upper end of a coaxial shaft or spindle —k—, the upper end of the rod or spindle —i— bearing against the under side of a head —m— which is flexibly connected by toggle links —n— to the opposite spherical sections —a— so that, when these governor sections are thrown laterally by centrifugal force, the head —m— will be depressed, thereby forcing the rod —i— downwardly through the sleeve and imparting similar axial movement to the spindle —k—. This spindle —k— is guided in suitable bearings —o— of a supporting frame —p— having a pendant central hub —n— provided with opposed keepers —s— which are normally engaged by spring catches —u— on the upper end of a weighted member —t—. This weighted member —t— is guided by suitable ways —w— and is provided with a laterally projecting stud —t'— for engagement with a slotted valve-operating lever —v— for operating a valve —v'— in a supply pipe —x— for the steam or other motive fluid leading to the engine, pump or similar apparatus, the speed of which is to be regulated.

Secured to the lower end of the rod or spindle —h— is a tapering or wedge-shape member —h'— located between and adapted to wedge against the adjacent sides of the spring catches —u— to disengage said catches from their keepers —s— as the rod is forced downwardly by the centrifugal action of the governor sections to cause the closing of the valve —v'— when the speed of the engine exceeds a predetermined limit.

The speed-regulating governor thus far described is utilized to operate a speed indicator —1— and for this purpose, we have shown a rock shaft —2— as journaled in a suitable bearing upon the supporting frame —p— and provided with a radially projecting arm —3— having its free end entering between and engaged by the adjacent faces of the collars —j— so that any axial movement which may be imparted to the rods —h— and —i— will transmit rocking motion to the arm —3— and its shaft —2— which is provided with an oppositely projecting arm —4— having a hollow threaded hub for receiving a screw —5—. The lower end of this screw is connected to one end of a spring —6— having its opposite end connected to a laterally projecting arm on the supporting frame —p— so that the spring is normally disposed some distance below the shaft —2— thereby tending to rock the arm —3— upwardly to restore the rods —h— and —i— and governing members —a— to their normal positions when the engine, pump or other apparatus to which the governor is connected is at rest, the tension of the spring being adjusted by the screw —5—. The rock shaft —2— is also provided with an additional crank arm —7— projecting upwardly therefrom and having its free end connected by a cable —8— to a lever —9— of the indicator presently described, the intermediate portions of the cable being passed around suitable idlers —10—.

The speed indicator preferably comprises a cylindrical case —11— having a circular dial plate —12— provided with a concentric row of graduations —13— and normally covered by a front transparent plate —14—. Centrally journaled in the case —11— is a spindle —15— carrying an index finger —16— which is movable around the dial, said spindle being also provided with a pinion —17— meshing with a toothed segment —18— on the upper end of a rock arm or lever —19—, the latter being also pivoted or fulcrumed within the case and provided with a pendant arm —20—.

For convenience of illustration, the index finger and its operating levers are shown in Fig. 1 in their intermediate position or substantially half way around the dial, said index finger being moved by its actuating mechanism in the direction indicated by arrow "Y" but is restored to its normal position by a retracting spring —21—. The levers —9— and —19— are also restored to their normal positions by separate retracting springs —22— and —23—, each of which has a separate function presently described.

The lever —9— is pivoted or fulcrumed intermediate its ends at —24— to the lower side of the case —11— and has its lower end provided with a series of apertures —25— any one of which is adapted to receive the adjacent end of the cable —8— to provide suitable adjustments for the desired throw or degree of movement of the index finger in calibrating the dial or adjusting the finger to correspond with a predetermined speed of movement of the governor as it is evident that if the cable were connected to the innermost aperture, the movement of the index finger through a predetermined arc would be more rapid under a given speed of the governor than if it was connected to the outermost aperture while the intermediate apertures would permit a closer adjustment of the index finger to give the proper reading on the dial under a predetermined speed of the governor. It is desired, however, to provide for a still closer adjustment of the index finger and for this purpose we have provided the upper end of the lever —9— with opposite sets of separately adjustable bearing members —27— and —28—, those of each set being disposed one above the other at opposite side of the interposed pendant arm —19— of the segment —18— so that either one of the bearing members —27— may be adjusted or set up to contact with the adjacent side of the arm —19— independently of the others of the same set while the bearing members of the opposite set may be employed to prevent excessive vibration of the segment and index finger actuated thereby, or to actuate the lever in a reverse direction, it being understood that the springs —22— and —23— serve to keep the active contact member —27— in engagement with the adjacent side of the arm —19—. In other words, the spring —22— is connected to the upper end of the lever —9— above its pivot tending to draw the contact member —27— toward the arm —19—, while the other spring —23— is connected to said arm —19— below its pivot and tends to draw the arm into engagement with the active bearing member —27—.

In Fig. 1, we have shown the uppermost bearing member —27— as adjusted for engagement with the adjacent side of the arm —19—, thereby imparting a maximum degree of movement to the index finger by a given movement of the lever —9— while, on the other hand, if the lower contact member —27— were adjusted for engagement with the extreme lower end of the arm —19—, it is evident that the degree of movement of the index finger would be less than that produced by the upper bearing member —27—. It is possible, however, to adjust the opposite sets of bearing members so as to establish a rolling contact with both sides of the arm —19— if it is desired to positively move the segments —18— in both directions. It is also possible to adjust the bearing members —27— so as to successively engage the adjacent side of the arm —19— from end to end or from the center toward either end of the series, thereby producing a variable leverage action of the segment —18— if such action should be necessary or desirable.

The bearing members —27— and —28— are adjusted by separate screws —30— engaging in threaded apertures in flanges —31— on the opposite longitudinal edges of a back plate —32— forming a part of the lever —9—, the inner ends of the screws being reduced in diameter and journaled in suitable sockets —34— in the adjacent sides of the bearings —27— and —28—. These bearings preferably consist of cylindrical posts or studs having their rear ends reduced and dovetailed and slidable in dovetailed grooves —35— in the front face of the plate as shown more clearly in Fig. 3, the bearings being held in their adjusted position by clamping screws —36— which are guided in lengthwise slots —37— in the plate —32—. It, therefore, follows that, if it is desired to adjust any one or more of the bearings —27— and —28—, it is simply necessary to loosen their respective screws —36— by means of a screw driver and then turn their corresponding adjusting screws until the bearings are properly positioned whereupon they may be retightened by their respective clamping screws —36—.

It is sometimes desirable to provide indicators of this class with an alarm adapted to be operated by one of the moving parts of the indicator to audibly indicate when the engine, pump or similar apparatus has reached a maximum safe degree of speed and for this purpose, we have secured within the indicating case —11— a spring contact terminal —40— located in the path of movement of one side (preferably the right hand side) of the upper end of the lever —9— and forming a part of a bell circuit —41— having an ordinary electric bell —42— connected therein so that, as the upper end of the lever —9— approaches the limit of its movement for operating the index finger in the direction indicated by the arrow "—Y—" to indicate a predetermined degree of speed, said lever, which forms the other terminal of the circuit, will be brought into contact with the terminal —40— and thereby close the circuit through the bell —42—, it being understood that the terminal —40— is suitably insulated from the case to which the lever —9— and other pole of the battery are electrically connected as shown more clearly in Fig. 5.

The operation of our invention will now be readily understood upon reference of the foregoing description and the accompanying drawings and, although we have shown a specific form of governor for operating the indicator, we do not wish to limit ourselves to any particular form, nor to the specific construction and arrangement of the connections between said governor and indicator, nor to the precise form of indicator herein shown and described.

What we claim is:

1. In combination with a speed-regulating governor, a speed indicator having a dial, an index finger movable around the dial, an operating lever for the index finger provided with openings at different distances from its fulcrum and connections between one of said openings and governor whereby the operation of the governor will operate the lever.

2. In combination with a speed-regulating governor, a speed indicator having a dial, an index finger movable around the dial, a pinion coaxial with the axis of the index finger and connected thereto, a lever having a toothed segment meshing with the pinion and provided with a pendant arm, an operating lever having a series of bearing members at different distances from its fulcrum and extending along one side of said arm for engagement therewith, separate adjusting devices for said bearing members, and connections between the lever, and means for transmitting motion from the governor to the operating lever.

3. In combination with a speed-regulating governor, a speed indicator having a dial, an index finger movable around the dial, a retracting spring for the index finger, and means actuated by the governor for operating the index finger against the action of the spring.

4. In combination with a speed-regulating governor, a speed indicator having a dial, an index finger movable around the dial, a supporting spindle for the index finger, a pinion secured to the spindle, a lever having a toothed segment meshing with the pinion and provided with a pendant arm, an operating lever having contact members for engaging opposite sides of the arm, and means for transmitting motion from the governor to said operating lever.

5. In combination with a speed-regulating governor, a speed indicator having a dial and an index finger movable around the dial, a supporting spindle for the index finger, a pinion on the spindle, a lever having a toothed segment meshing with the pinion and provided with a pendant arm, an operating lever having separate sets of bearing members for engaging opposite sides of the arm, separate adjusting devices for the bearing members, and means for transmitting motion from the governor to the operating lever.

In witness whereof we have hereunto set our hands this 7th day of Jan'y 1913.

ROBERT CRONLEY.
FREEMAN G. AXTELL.

Witnesses:
EZRA A. BARNES,
MERRICK STOWELL.